(12) United States Patent
Drews

(10) Patent No.: US 6,463,535 B1
(45) Date of Patent: *Oct. 8, 2002

(54) SYSTEM AND METHOD FOR VERIFYING THE INTEGRITY AND AUTHORIZATION OF SOFTWARE BEFORE EXECUTION IN A LOCAL PLATFORM

(75) Inventor: Paul C. Drews, Gaston, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,275

(22) Filed: Oct. 5, 1998

(51) Int. Cl.[7] ............................................. H04L 9/00
(52) U.S. Cl. ................................. 713/176; 713/187
(58) Field of Search .................... 713/1–2, 187–189, 713/200–201, 176–177, 191

(56) References Cited

U.S. PATENT DOCUMENTS

| | | | |
|---|---|---|---|
| 4,206,315 | 6/1980 | Matyas et al. | 178/22 |
| 4,656,474 | 4/1987 | Mollier et al. | 380/23 |
| 4,868,877 | 9/1989 | Fischer | 380/25 |
| 5,005,200 | 4/1991 | Fischer | 380/30 |
| 5,214,702 | 5/1993 | Fischer | 380/30 |
| 5,218,637 | 6/1993 | Angebaud | 380/23 |
| 5,349,643 | * 9/1994 | Cox et al. | 380/25 |
| 5,367,573 | 11/1994 | Quimby | 380/25 |
| 5,444,850 | 8/1995 | Chang | 395/200 |
| 5,465,299 | 11/1995 | Matsumoto | 380/23 |
| 5,473,692 | 12/1995 | Davis | 380/25 |
| 5,479,509 | 12/1995 | Ugon | 380/23 |
| 5,537,475 | 7/1996 | Micali | 380/30 |
| 5,568,552 | 10/1996 | Davis | 380/4 |
| 5,574,915 | * 11/1996 | Lemon et al. | 712/220 |
| 5,778,070 | * 7/1998 | Mattison | 380/25 |
| 5,805,706 | 9/1998 | Davis | 380/49 |
| 5,844,986 | * 12/1998 | Davis | 713/187 |
| 5,919,257 | * 7/1999 | Trostle | 713/200 |
| 5,935,242 | * 8/1999 | Madany et al. | 713/1 |
| 5,937,063 | * 8/1999 | Davis | 713/187 |
| 5,944,821 | * 8/1999 | Angelo | 713/200 |

OTHER PUBLICATIONS

Schneier, Bruce, "Applied Cryptography: Protocols, Algorithms, and Source Code in C", Oct. 1995, pp. 574–577.*

Arbaugh et al. A Secure and Reliable Bootstrap Architecture. Dec. 1996.*

Hains, David. LAN Security: Are You Taking It Seriously? International Journal of Information Resource Management vol. 3, issue 4; Bradford; 1992. Abstract.*

Braziller, Clay. Centralized boot systems tackle distributed network security needs. Computing Canada; Willowdale; Sep. 1993. Abstract.*

Schneier, Bruce. Applied Cryptography: Protocols, Algorithms, Source Code in C., 2nd ed. Oct. 1995. section 2.6, pp. 34–41.*

Bruce Schneier, Applied Cryptography: Protocols, Algorithms, and Source Code in C, Oct. 1995, pp. 574–577, Second Edition.

* cited by examiner

Primary Examiner—Gail Hayes
Assistant Examiner—Ho S. Song
(74) Attorney, Agent, or Firm—Blakely, Sokoloff, Taylor & Zafman LLP

(57) ABSTRACT

A method to verify integrity of information and selectively determine whether the information is authorized to be executed by the platform. The information is downloaded to a platform operating in a pre-boot operational state.

10 Claims, 6 Drawing Sheets

_US 6,463,535 B1_

SYSTEM AND METHOD FOR VERIFYING THE INTEGRITY AND AUTHORIZATION OF SOFTWARE BEFORE EXECUTION IN A LOCAL PLATFORM

BACKGROUND

1. Field

The present invention relates to the field of data security. More particularly, this invention relates to a scheme for verifying the integrity of downloaded software.

2. General Background

Computers have become a desirable product for both commercial and personal use, in part due to their versatility. While the purchase price of computers has decreased over the last few years, the total cost of computer ownership has remained generally constant. One reason is that computers need require occasional maintenance to repair or replace faulty hardware, reconfigure corrupted software, or perform other tasks. Normally, computer technicians, at a substantial cost, perform these tasks.

Currently, many companies employ one or more on-site computer technicians to install, support and maintain stand-alone computers. In fact, large companies have established Information Technology (IT) departments that feature computer technicians responsible for servicing thousands of stand-alone computers situated in multiple facilities. Thus, a significant portion of the technician's working time may be spent traveling from one job to another. To reduce overhead costs and improve efficiency, it is desirable to lessen the amount of time spent wasted by computer technicians traveling between jobs or facilities. This may be accomplished by implementing a centralized platform with multiple disk drives from which employees can remotely access information as needed. As a result, the computer technicians can diagnose and service problems with the centralized platform (e.g., drive errors) at one location, and thus, greatly reduce the amount of travel time.

As centralized platforms are adopted by more and more companies, the general architecture of computers may be altered to exclude disk drives, which are the least reliable component of a computer. This computer architecture alteration, however, poses a problem because most computers boot from a local disk drive.

To overcome this problem, a boot procedure of the computer may be modified so that boot software is downloaded over a network. In particular, during its boot sequence, the local platform would access a particular memory location on a disk drive remotely located at the centralized platform and retrieve a boot image from that memory location. The boot image would be downloaded into main memory of the computer and executed during the boot sequence. Unfortunately, there is currently no security scheme to ensure the integrity of the boot image (e.g., check that the software is free from viruses or has not been tampered with before or during download) as well as its authenticity (e.g., check that the boot image originated from its proper source). The present invention provides a scheme that overcomes these security flaws.

SUMMARY OF THE INVENTION

The present invention relates to a method for verifying integrity of information. The information is downloaded to a platform operating in a pre-boot operational state. Thereafter, a determination of whether the information is authorized to be executed by the platform is selectively performed.

BRIEF DESCRIPTION OF THE DRAWINGS

The features and advantages of the present invention will become apparent from the following detailed description of the present invention in which.

DETAILED DESCRIPTION

Herein, certain embodiments of the invention are described for verification of downloaded software to a local platform, operating in a pre-boot operational state, before execution of that software. For this illustrative embodiment, the "software" comprises an image of an application executed during the boot-up sequence of the local platform (herein referred to as a "boot image"). However, this embodiment should be broadly construed as illustrative in nature to merely represent the spirit of the invention. Furthermore, verification of the downloaded boot image confirms the integrity of the boot image (e.g., image has not been altered), and perhaps, that the image is authorized to run on the local platform.

Certain terminology is used to describe various embodiments of the system architecture. A "platform" includes hardware whose functionality is dependent on software executed therein. Examples of a platform include, but are not limited or restricted to a computer (e.g., a laptop, desktop, hand-held, server, mainframe, etc.), imaging equipment (e.g., printer, facsimile machine, etc.), and a set-top box (cable box or network computer, etc.). A "link" includes one or more pathways for information to be routed. These pathways may be established through any type of medium such as electrical wire, fiber optics, cable, Plain Old Telephone System (POTS) lines, leased lines or even wireless communications. Also, information is considered "downloaded" when acquired from a remote location and provided to the platform through a link or a removable storage device such as a floppy disk, compact disk, smart card, and the like.

With respect to cryptography related terminology, a "key" is an encoding and/or decoding parameter. In general, a "digital signature" includes digital data encrypted with a private key of its signatory. In some cases, digital data is provided in its entirety or in an encoded form produced by a one-way hash function. The digital signature is used to protect the integrity of data by avoiding its illicit modification and is used to identify the source of data. A "digital certificate" is a message in a standardized format comprising (i) a public key of the source providing the software to the local platform (hereafter referred to as the "subject public key"), (ii) information (e.g., public key, code, serial number, etc.) to identify the issuer of the digital certificate, and (iii) a digital signature of the certificate produced with a private key of the issuer. Examples of an "issuer" include a manufacturer, a trade association, a governmental entity, a bank, a particular department of a company (e.g., security or the Information Technology "IT" department) or any other entity in a position of trust. A "digital certificate chain" includes an ordered sequence of multiple digital certificates arranged for authorization purposes as described below, where each successive certificate represents the issuer of the preceding certificate.

Figure 1:
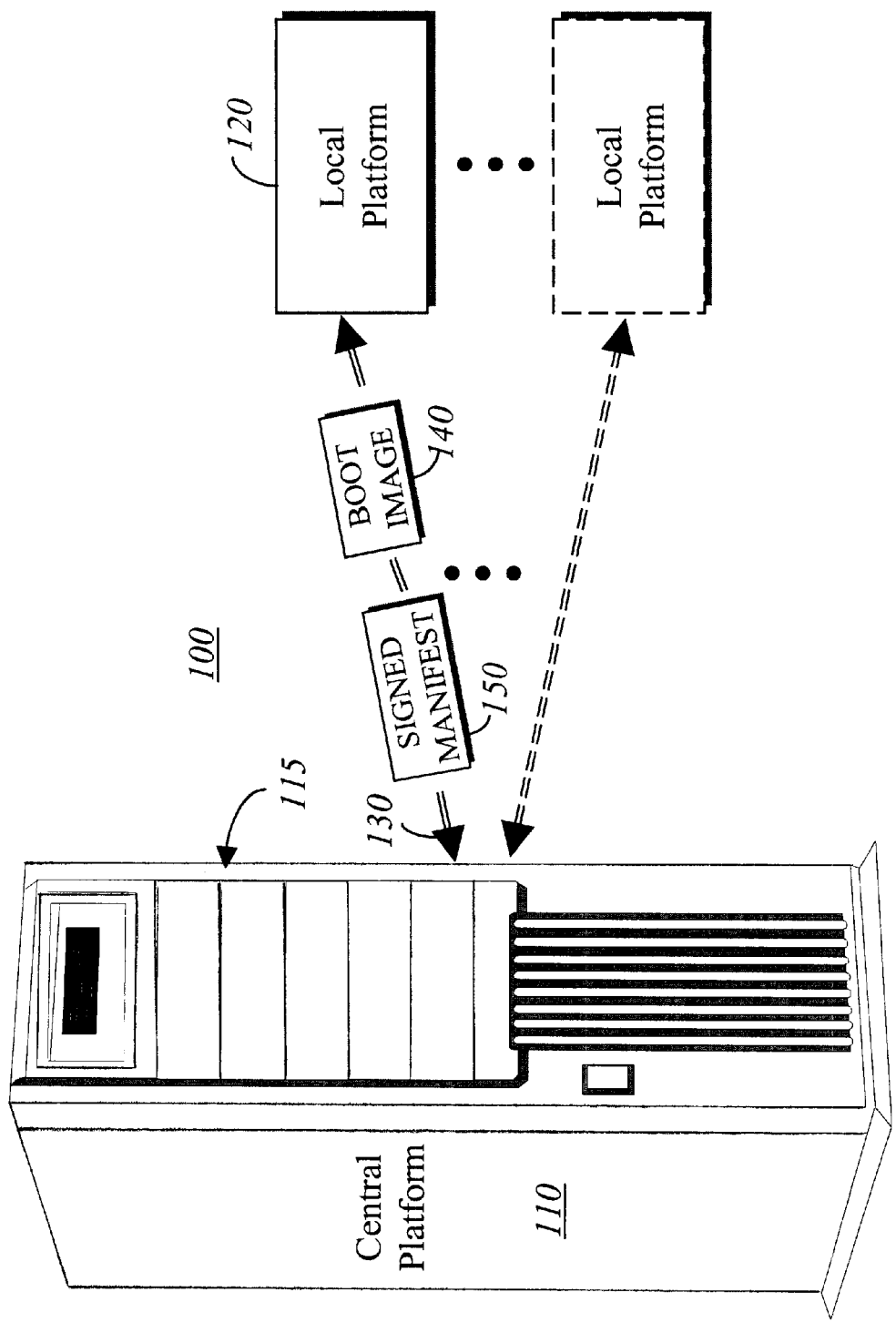
FIG. 1 is a block diagram of an illustrative embodiment of a network including a central platform and one or more local platforms.

Referring now to FIG. 1, an illustrative block diagram of an embodiment of a network 100 comprising a central platform 110 and one or more local platforms 120 is shown. In this embodiment, central platform 110 includes a server having at least one disk drive 115. Disk drive 115 is loaded with applications, where images of the applications are downloaded to a local platform 120 upon request. For example, during its pre-boot operational state, local platform 120 may request a boot image 140 to be downloaded over communication link 130 from central platform 110. Of course, boot image 140 may comprise one or more sub-images forming the entire boot image. To verify that boot image 140 is executable by local platform 120, a signed manifest 150 (see FIG. 3) corresponding to boot image 140 is downloaded to local platform 120 generally concurrent in time with boot image 140. Of course, it is contemplated that signed manifest 150 may be downloaded preceding or subsequent to the transfer of boot image 140.

Figure 2:
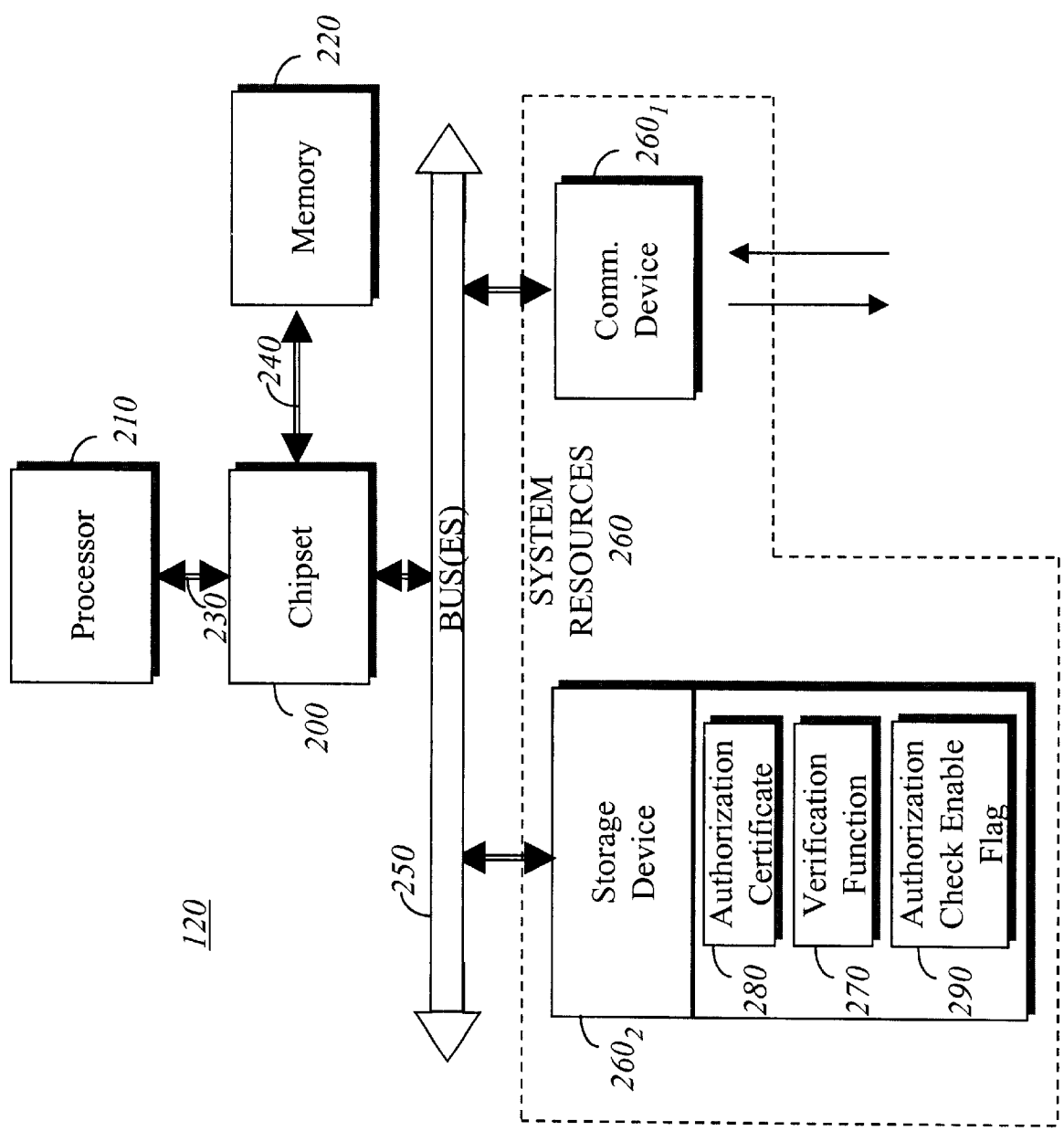
FIG. 2 is a block diagram of an illustrative embodiment of a local platform.

Referring to FIG. 2, an illustrative block diagram of an embodiment of local platform 120 is shown. In this embodiment, local platform 120 comprises a chipset 200 coupled to a processor 210 and a memory 220 through a host bus 230 and a memory bus 240, respectively. In addition, chipset 200 is coupled to a bus 250 that provides a pathway to one or more system resources 260. Herein, bus 250 comprises a multiplexed bus (e.g., Peripheral Component Interconnect "PCI" bus); however, any other type of bus architecture (e.g., Industry Standard Architecture "ISA") or combination of bus architectures may be used. For example, bus 250 is shown as a single bus, but it is contemplated that bus 250 may include multiple buses coupled together through bridge circuitry. For that embodiment, system resources 260 would be coupled to at least one of the multiple buses.

As shown, system resources 260 comprise a communication device $260_1$ and a persistent storage device $260_2$. Communication device $260_1$ comprises a configuration to establish communications with central platform 110 over communication link 130 of FIG. 1. Examples of communication device $260_1$ include a network interface card, a modem card or an external modem. Persistent storage device $260_2$ includes, for example, a programmable, non-volatile memory such as flash memory, battery-backed random access memory (RAM), and the like.

Prior to the local platform undergoing a boot procedure, persistent storage device $260_2$ is provided with a verification function 270, an authorization certificate 280 and an authorization check enable flag 290. It is contemplated that this information may be protected against unauthorized modification by a number of techniques. For example, processor 210 may be set to trap and disallow memory-write accesses within an address range, or chipset 200 may be set to provide a one-way write-protect to a memory address range during an earlier phase of the boot procedure. Other techniques that may be used include (i) configuring persistent storage device $260_2$ to be non-responsive to memory-write accesses; (ii) providing a software interface employing user authentication to update the contents of persistent storage device $260_2$; and (iii) implementing various materials or circuitry to attempt to detect physical tampering to the persistent storage device $260_2$, which would then render the local platform inoperable.

Figure 5A:
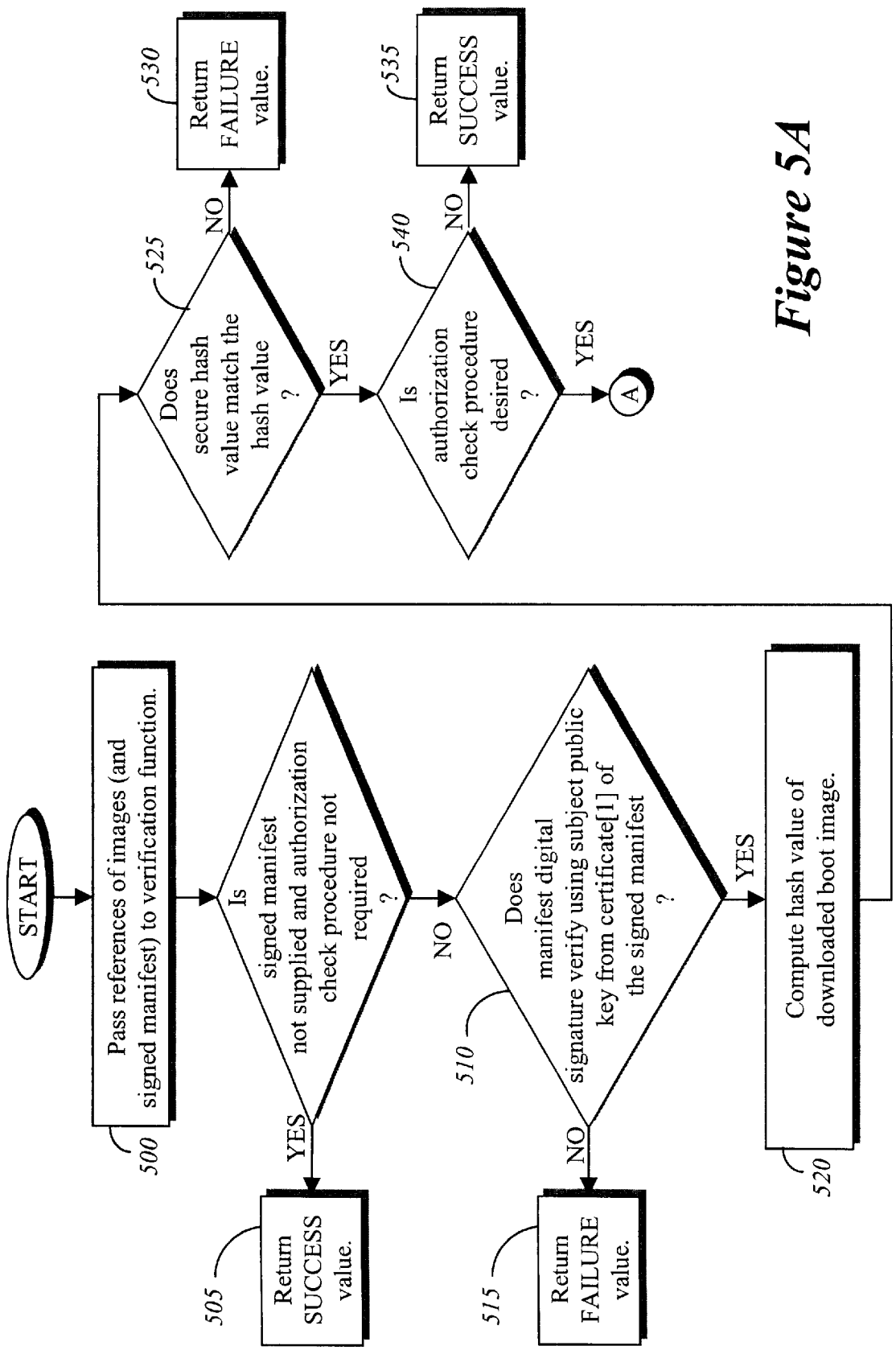
FIGS. 5A and 5B are illustrative flowcharts of the acts performed to verify that the downloaded application has not been tampered with and the downloaded application is authorized to run on the local platform.
Figure 5B:
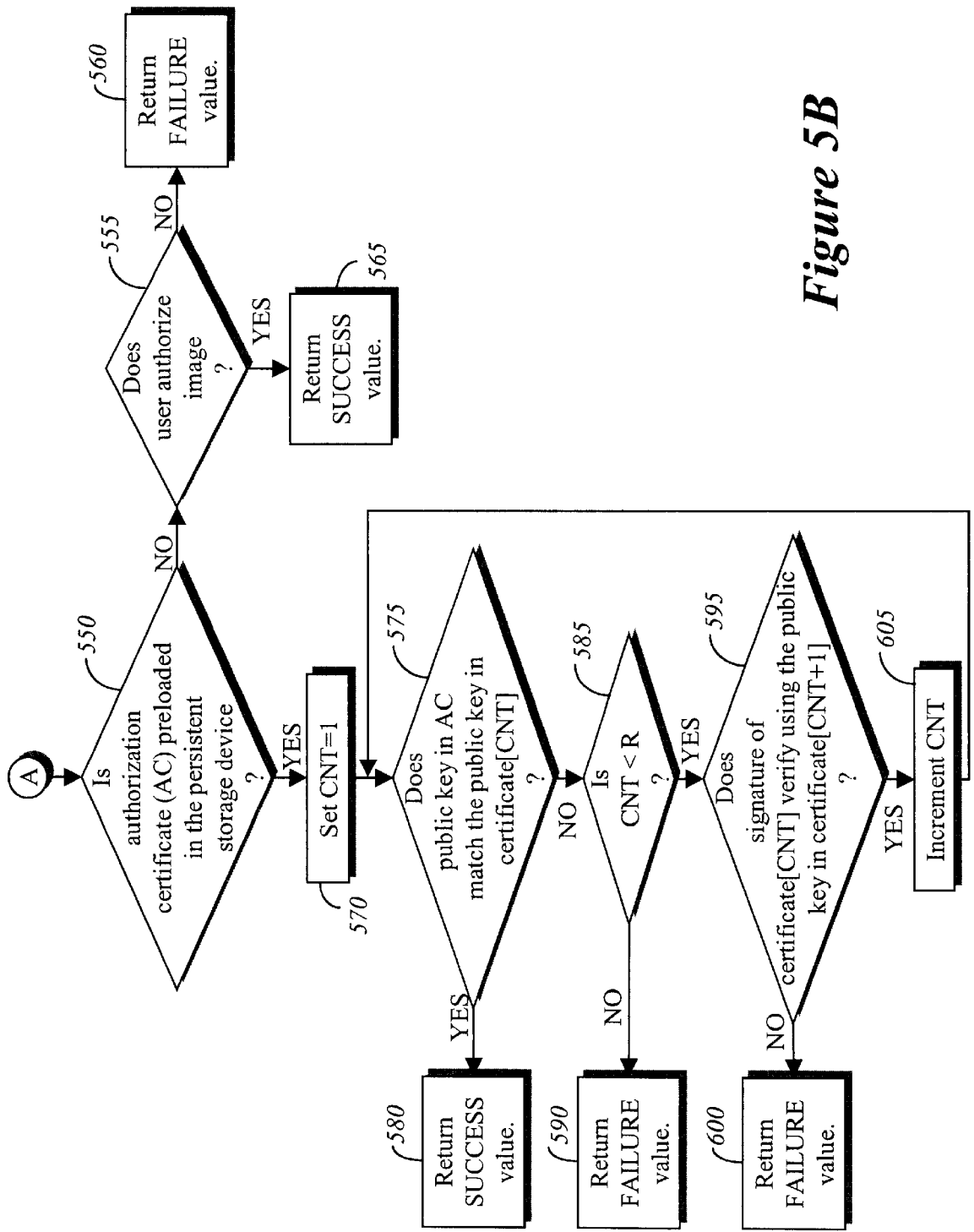

In this embodiment, as further shown in detail in FIG. 5A and 5B, verification function 270 includes software, executed by the local platform during pre-boot, in order to perform an integrity check procedure. The integrity check procedure verifies that a boot image has not been modified since the signed manifest was created. Thus, modifications to the boot image can be detected while the boot image is stored locally or at the central platform, or when in transit to the local platform. As an optional feature, the verification function 270 further performs an authorization check procedure to determine whether the boot image has been provided by an acceptable source. The authorization check procedure is performed when authorization check enable flag 290 is enabled.

Since the central platform actually determines which boot image(s) is (are) authorized to be downloaded to the local platform, only a single configuration parameter, authorization certificate 280, is installed into local platform 120. This reduces the cost of maintaining many different types of local platform configurations. More specifically, the installation of authorization certificate 280 provides a public key of a source (e.g., person, company, etc.) authorized to provide the boot image. Confirmation on whether or not the source is authorized to provide the image is determined through analysis of the signed manifest using the public key provided by authorization certificate 280. It is contemplated that multiple authorization certificates may be implemented in persistent storage device $260_2$ when it is desirable for different, unrelated sources to authorize boot images to run on the local platform.

Figure 3:
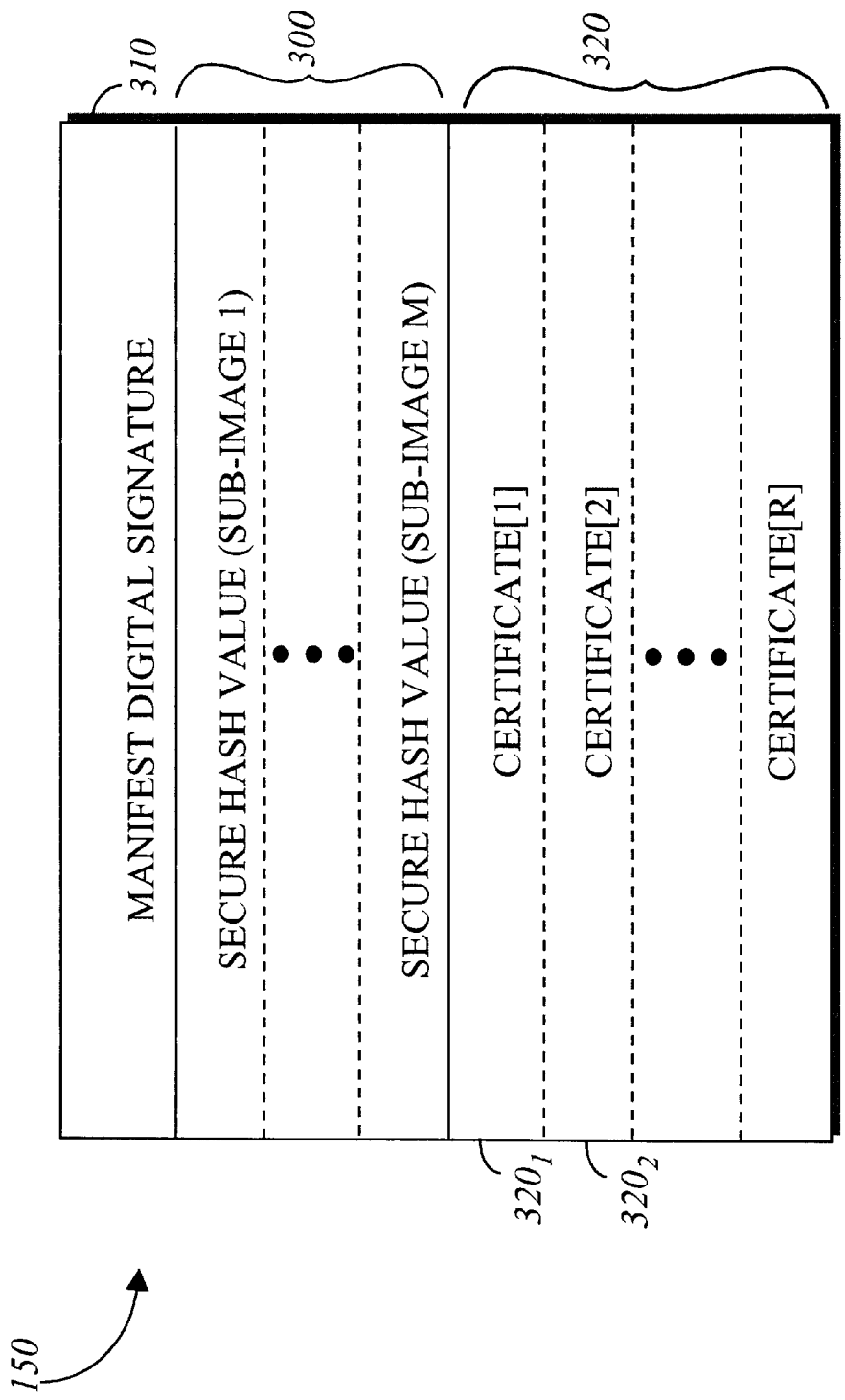
FIG. 3 is a block diagram of an illustrative embodiment of a digitally signed manifest downloaded from the central platform during the boot sequence of the local platform.

Referring to FIG. 3, an illustrative block diagram of signed manifest 150 corresponding to boot image 140 is shown. Signed manifest 150 includes (i) a secure hash value 300 for each sub-image of the boot image, (ii) a manifest digital signature 310, and (iii) a certificate chain 320 providing the identify of the signatory of signed manifest 150 and those entities which have bestowed signing authority to the signatory. In this particular, embodiment, each secure hash value 300 is produced by loading a corresponding sub-image into a one-way hash function that converts the portions of the boot image into information of a fixed length ("hash value"). The term "one-way" indicates that there does not readily exist an inverse function to recover any discernible portion of the boot image from the hash value.

Figure 4:
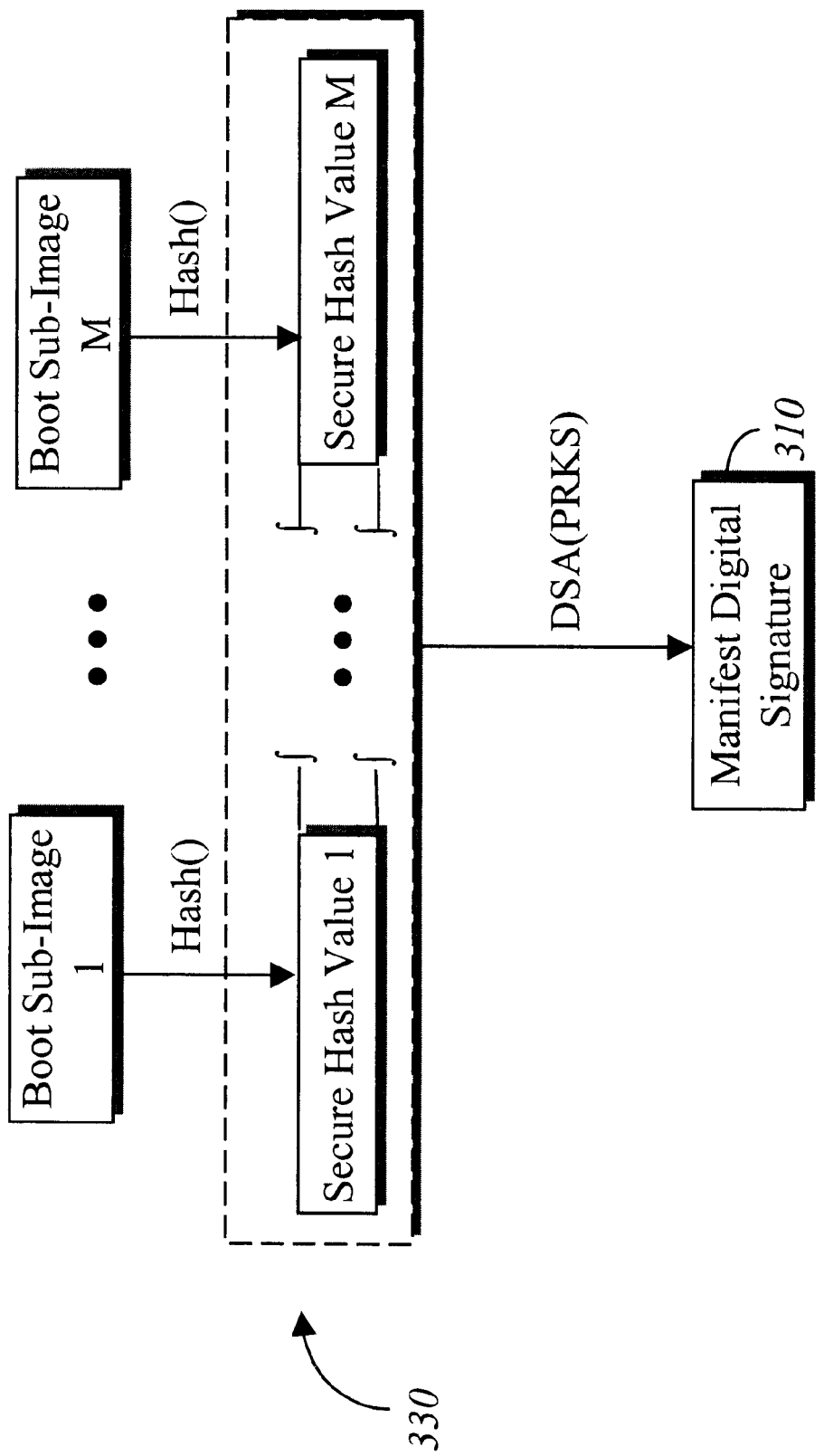
FIG. 4 is a block diagram of an illustrative embodiment of the acts for creating the manifest digital signature.

As shown in FIG. 4, in this embodiment, manifest digital signature 310 is produced by initially appending M hash values 300 end-to-end (where "M"is a positive whole number, $M \geq 1$) to provide a hash set 330. Thereafter, hash set 330 is digitally signed with a private key (PRKS) of the source authorized to provide the boot image. Herein, the functions used for digitally signing information include Rivest Shamir Adleman (RSA) by RSA Data Security, Inc. of Redwood City, Calif. and the Digital Signature Algorithm (DSA) proposed by the National Institute of Standards. Both of these functions are described in pages 466–494 of a publication entitled Applied Cryptography—Protocols, Algorithms and Source Code in C by Bruce Schneier, published by John Wiley & Sons, Inc. (1996) although, of course, the invention is not limited in scope in this respect.

Referring back to FIG. 3, certificate chain 320 includes a set of "R" digital certificates, where "R" is a positive whole number ($R \geq 1$). A first digital certificate $320_1$ (referred to as "certificate[1]") includes a subject public key of the signatory, namely the source responsible for digitally signing the signed manifest 150. Thereafter, the remaining "R-1" digital certificates collectively provide a sequence of those sources issuing the first digital certificate $320_1$ used to sign the signed manifest 150. For example, a second digital certificate 320₂ (referred to as "certificate [2]") includes the subject public key of the source that signed certificate[1] using the corresponding private key of that source.

The use of certificate chain 320 provides the ability to delegate signing authority from one source to another. The signatory of the signed manifest is accepted as an authorized signatory when one of the certificates in certificate chain 320, for example, certificate[K], where "K" is a positive whole number ($1 \leq K \leq R$), includes a subject public key matching the subject public key in the authorization certificate 280. Also, for each certificate[N] in the certificate chain 320, where "N" is a positive whole number ($1 \leq N \leq K$), certificate[N] verifies with the subject public key of certificate[N+1] in the certificate chain 320. An authorized source delegates authorization to a signatory by providing an unbroken sequence of certificates between the authorized source and the signatory.

Referring now to FIGS. 5A and 5B, illustrative flowcharts are shown outlining the acts performed to verify the integrity of downloaded software, namely that the software has not been modified and is authorized to run on the local platform. Upon retrieving a boot image, the verification function is invoked and given references associated with the boot image (block 500). In this embodiment, the "references" include address pointers to data structures associated with both a data object (e.g., an in-memory copy of the boot image awaiting verification) and an optional signed manifest. Each of these data structures comprise (i) a physical address pointer to a contiguous block of memory and (ii) a length in bytes.

Upon being invoked, the verification function verifies the boot image. If the application image can be executed by the local platform, the verification function returns a SUCCESS signal value (blocks 505, 535, 565 and 580). Otherwise, verification function returns a FAILURE signal value to indicate that the boot image cannot be executed by the local platform (blocks 515, 530, 560, 590 and 600). Of course, it is contemplated that the verification function automatically returns a SUCCESS signal value when no signed manifest accompanies the boot image when downloaded to the local platform and no authorization check procedure is required or performed (block 505). As a result, no integrity check procedure is performed as well.

However, if the reference of the signed manifest is accessible by the verification function, the manifest digital signature is verified by using the subject public key from certificate[1] of the signed manifest (block 510). For example, this may be accomplished by decrypting the manifest digital signature with the subject public key and comparing the result with a secure hash value computed for the signed data. If the manifest digital signature does not verify properly, the verification function returns a FAILURE signal value (block 515). Otherwise, as shown in blocks 520–525, a hash value of the downloaded boot image is calculated and compared with the secure hash value contained in the signed manifest. If a match is not detected, the verification function returns a FAILURE signal value that causes the network boot procedure to fail (block 530).

Next, the verification function determines whether the authorization check procedure is desired (block 540). This is accomplished by determining whether the authorization check enable flag is enabled. If not, the verification function returns a SUCCESS signal value, indicative that the boot image is executable by the local platform, because the data integrity check procedure has successfully completed (block 535). Otherwise, the verification function undergoes the authorization check procedure described in FIG. 5B.

The authorization check procedure is to ensure that the source of the signed manifest signature has been authorized. This is accomplished by confirming the validity of the certificate chain contained in the signed manifest. For example, as shown in FIG. 5B, a determination is made whether the authorization certificate has been pre-loaded in a persistent storage device (block 550). If not, a determination is made whether the user has authorized the image (block 555). Such authorization may be accomplished, for example, by asking the user to compare a hash of the boot image against a known "good" hash value. If the user authorizes the image, the verification function returns a SUCCESS signal value to continue the network boot procedure (block 565). Otherwise, the verification function returns a FAILURE signal value (block 560).

In the event that one or more authorization certificates have been pre-loaded into a persistent storage device, a count value (CNT) is set to a predetermined number (e.g., CNT=1) and a determination is made whether a public key of the signatory, found in certificate[CNT], matches the public key of any of the authorization certificate(s) (blocks 570–575). If so, the verification function returns a SUCCESS signal value representing that the boot image is authorized to run on the local platform (block 580). If no match is detected, a determination is made as to whether CNT<R (number of certificates in the certificate chain) to check whether or not each digital certificate has been checked (block 585). If CNT$\geq$R, the verification function returns a FAILURE signal value, preventing the boot image from being run on the local platform (block 590). However, if CNT<R, a determination is made whether the digital signature contained in certificate[CNT] verifies using the public key of certificate[CNT+1] (block 595). If not, the verification function returns a FAILURE signal value preventing the boot image from being run on the local platform (block 600). However, if the verification of certificate[CNT] using the public key of certificate[CNT+1] was successful, CNT is incremented (block 605) and blocks 575–605 are repeated for each certificate until a signal value is returned.

While certain illustrative exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:

providing information to a platform operating in a pre-boot operational state, the information including (1) an image of a boot application to be executed by the platform during a boot procedure, and (2) a signed manifest separate from the boot application, the signed manifest including (i) a secure hash value that includes a plurality of hash values having a one-to-one correspondence with a plurality of sub-images forming the image of the boot application, (ii) a manifest digital signature that includes the plurality of hash values collectively signed with a private key of a selected signatory, and (iii) a certificate chain;

verifying integrity of the boot application downloaded to the platform; and upon determining that an authorization check enable flag of the platform is enabled, determining whether the boot application is authorized to be executed by the platform by (1) accessing contents from each digital certificate of the certificate chain to obtain a public key of a signatory, (2) comparing a subject public key within each digital certificate with a public key of the signatory of the manifest digital signature, and (3) authorizing execution of the boot application if the subject public key matches the public key of the signatory.

2. The method of claim 1, wherein the selected signatory is the first source.

3. The method of claim 2, wherein the certificate chain of the signed manifest includes a first digital certificate, the first digital certificate includes a public key of the first source, a public key of an issuer of the first digital certificate and a digital signature of the first digital certificate digitally signed by a second source.

4. The method of claim 3, wherein the certificate chain further includes a second digital certificate, the second digital certificate including a public key of the second source, a public key of an issuer of the second digital certificate and a digital signature of the second digital certificate digitally signed by a third source.

5. The method of claim 2 wherein the integrity of the information is verified by (i) accessing the contents of a first digital certificate of the certificate chain to obtain a public key of the first source, (ii) verifying the manifest digital signature with the public key of the first source, (iii) accessing contents of the signed manifest to obtain the secure hash value, (iv) performing a hash operation on the image of the boot application in accordance with a predetermined hash function, used to produce the secure hash value, to produce a resultant hash value, and (v) comparing the secure hash value with the resultant hash value.

6. The method of claim 5, wherein the integrity of the information is deemed to be maintained if the secure hash value matches the resultant hash value.

7. The method of claim 1 wherein the certificate chain of the signed manifest includes a plurality of successive digital certificates of which a $R+1^{th}$ digital certificate includes a public key of a signatory of a digital signature in a $R^{th}$ digital certificate, where R is a positive whole number.

8. A platform comprising:
a processor; and
a persistent storage device in communication with the processor, the persistent storage device including
an authorization certificate including a public key of a source downloading a boot image to the platform,
an authorization check enable flag to signal a verification function to verify that the source is authorized to download the boot image; and
a verification function being software to be executed by the processor to verify whether the downloaded boot image has been modified, the verification function being configured to
receive information from a first source while the platform is in a pre-boot operational state, the information to include (1) an image of a boot application to be executed by the platform during a boot procedure, and (2) a signed manifest separate from the boot application, the signed manifest to include (i) a secure hash value to include a plurality of hash values to have a one-to-one correspondence with a plurality of sub-images to form the image of the boot application, (ii) a manifest digital signature to include the plurality of hash values to be collectively signed with a private key of a selected signatory, and (iii) a certificate chain, and
when the authorization check enable flag is enabled, determine. whether the boot application is authorized for execution by the platform by (1) accessing contents from each digital certificate of the certificate chain to obtain a public key of a signatory, (2) comparing a subject public key within each digital certificate with a public key of the signatory of the manifest digital signature, and (3) authorizing execution of the boot application if the subject public key matches the public key of the signatory.

9. The platform of claim 8, wherein the persistent storage device includes a flash memory.

10. The platform of claim 8, wherein the persistent storage device includes a battery backed random access memory.

* * * * *

UNITED STATES PATENT AND TRADEMARK OFFICE
CERTIFICATE OF CORRECTION

PATENT NO.     : 6,463,535 B1
DATED          : October 8, 2002
INVENTOR(S)    : Drews It is certified that error appears in the above-identified patent and that said Letters Patent is hereby corrected as shown below:

Column 1,
Line 31, after "spent", delete "wasted".

Signed and Sealed this

Twenty-fourth Day of June, 2003

JAMES E. ROGAN
*Director of the United States Patent and Trademark Office*